US012735075B2

(12) United States Patent
Inoue

(10) Patent No.: US 12,735,075 B2
(45) Date of Patent: Sep. 15, 2026

(54) DETERMINATION DEVICE, DETERMINATION METHOD, AND STORAGE MEDIUM

(71) Applicant: HONDA MOTOR CO., LTD., Tokyo (JP)

(72) Inventor: Daichi Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 19/059,744

(22) Filed: Feb. 21, 2025

(65) Prior Publication Data

US 2025/0282394 A1 Sep. 11, 2025

(30) Foreign Application Priority Data

Mar. 8, 2024 (JP) ................................ 2024-035562

(51) Int. Cl.
*B60W 20/00* (2016.01)
*B60W 60/00* (2020.01)
(Continued)

(52) U.S. Cl.
CPC ....... *B60W 60/00274* (2020.02); *G06V 20/58* (2022.01); *G06V 20/588* (2022.01);
(Continued)

(58) Field of Classification Search
CPC ................ B60W 30/12; B60W 60/00; B60W 60/00274; B60W 2420/403;
(Continued)

(56) References Cited

U.S. PATENT DOCUMENTS 11,396,297 B2 * 7/2022 Kanoh .................. B60W 10/20
11,840,233 B2 * 12/2023 Kumano ............. G06V 20/588
(Continued)

FOREIGN PATENT DOCUMENTS

JP 2023-148405 10/2023
JP 2024-025478 2/2024
(Continued)

OTHER PUBLICATIONS

Japanese Notice of Allowance for Japanese Patent Application No. 2024-035562 mailed Apr. 1, 2026.
(Continued)

*Primary Examiner* — Andrew Joseph Rudy
(74) *Attorney, Agent, or Firm* — Amin, Turocy & Watson, LLP

(57) ABSTRACT

A determination device of an embodiment includes a first recognizer configured to recognize a first partition line that divides a travel lane of a host vehicle, and other vehicles present around based on a detection device, a second recognizer configured to recognize a second partition line that divides lanes around the host vehicle based on map, and a determiner configured to perform correctness determination on whether at least one of the first and the second partition line is correct based on at least one of the first and the second partition line and traveling trajectories of the other vehicles, in which, when a first and a second other vehicle recognized laterally are moving in front of the host vehicle, and the positions after the lateral movement differ by a predetermined distance or more, the determiner does not perform the correctness determination based on the first and the second other vehicle.

7 Claims, 6 Drawing Sheets

(51) Int. Cl.
*G06V 20/56* (2022.01)
*G06V 20/58* (2022.01)

(52) U.S. Cl.
CPC ... *B60W 2420/403* (2013.01); *B60W 2552/10* (2020.02); *B60W 2552/53* (2020.02); *B60W 2554/4041* (2020.02); *B60W 2554/80* (2020.02); *B60W 2556/20* (2020.02); *B60W 2556/40* (2020.02)

(58) Field of Classification Search
CPC ......... B60W 2556/20; B60W 2556/40; B60W 2552/20; B60W 2552/53; B60W 2554/4041; B60W 2554/80; G06V 20/58; G06V 20/588
USPC .................................................... 701/23, 445
See application file for complete search history.

(56) References Cited

U.S. PATENT DOCUMENTS

| | | | | |
|---|---|---|---|---|
| 12,036,984 | B2 * | 7/2024 | Tamura | B60W 60/0027 |
| 12,269,492 | B2 * | 4/2025 | Inoue | B60W 60/005 |
| 12,539,851 | B2 * | 2/2026 | Hosokawa | B60W 30/12 |
| 2021/0380167 | A1 * | 12/2021 | Kataoka | B62D 15/029 |
| 2024/0051529 | A1 | 2/2024 | Inoue et al. | |
| 2024/0051531 | A1 | 2/2024 | Inoue et al. | |
| 2024/0051532 | A1 | 2/2024 | Inoue | |

FOREIGN PATENT DOCUMENTS

| | | |
|---|---|---|
| JP | 2024-025482 | 2/2024 |
| JP | 2024-028260 | 3/2024 |

OTHER PUBLICATIONS

Japanese Office Action for Japanese Patent Application No. 2024-035562 mailed Nov. 11, 2025.

* cited by examiner

DETERMINATION DEVICE, DETERMINATION METHOD, AND STORAGE MEDIUM

CROSS-REFERENCE TO RELATED APPLICATION

Priority is claimed on Japanese Patent Application No. 2024-035562, filed Mar. 8, 2024, the content of which is incorporated herein by reference.

BACKGROUND

Field of the Invention

The present invention relates to a determination device, a determination method, and a storage medium.

Description of Related Art

In recent years, there has been increased effort to provide access to sustainable transport systems that take into consideration vulnerable transport participants. To realize this, research and development to further improve the safety and convenience of traffic through research and development related to an automated driving technology has been mainly focused upon. With regard to this, conventionally, when it is determined that there is a deviation between a road partition line (a camera partition line) shown in a camera image and a road partition line (a map partition line) shown in map information, a technology for controlling a driving mode of a vehicle on the basis of a degree of parallelism between traveling trajectories of other vehicles in the vicinity and the camera partition line is known (for example, Japanese Unexamined Patent Application, First Publication No. 2023-148405).

SUMMARY

Incidentally, in the conventional automated driving technology, when correctness determination on whether the camera partition line or the map partition line is correct is performed on the basis of the traveling trajectories of other vehicles, there has been a possibility that it may not be possible to appropriately determine whether other vehicles are traveling along the partition line or changing lanes. For this reason, there has been a problem that it may not be possible to perform appropriate correctness determination on a partition line based on the traveling trajectories of other vehicles.

To solve the problems described above, one of purposes of this application is to provide a determination device, a determination method, and a storage medium that can more appropriately determine correctness of a partition line according to partition lines around the host vehicle and traveling situations of other vehicles. In turn, it will contribute to a development of a sustainable transport system.

The determination device, determination method, and storage medium according to the present invention have adopted the following configuration.

(1): A determination device according to one aspect of the present invention includes a first recognizer configured to recognize a surrounding situation including a first partition line that divides a travel lane of a host vehicle and other vehicles present around the host vehicle on the basis of an output of a detection device that has detected a surrounding situation of the host vehicle, a second recognizer configured to recognize a second partition line that divides lanes around the host vehicle based on map information, on the basis of position information of the host vehicle, and a determiner configured to perform correctness determination on whether at least one of the first partition line and the second partition line is correct on the basis of at least one of the first partition line and the second partition line and traveling trajectories of the other vehicles, in which, when a first other vehicle and a second other vehicle recognized by the first recognizer laterally are moving in front of the host vehicle, and the positions after the lateral movement differ by a predetermined distance or more, the determiner does not perform the correctness determination on the basis of the first other vehicle and the second other vehicle.

(2): In the aspect of (1) described above, the predetermined distance may be set on the basis of a width of a lane divided by the first partition line or a lane divided by the second partition line.

(3): In the aspect of (1) described above, the predetermined distance may be set according to a distance between the lateral positions before the first other vehicle and the second other vehicle move laterally.

(4): In the aspect of (1) described above, when the first recognizer recognizes a third other vehicle that is different from the first other vehicle and the second other vehicle, and the third other vehicle has not moved laterally in the same direction as the first other vehicle and the second other vehicle that have moved laterally at positions that are different by a predetermined distance or more, the determiner may perform the correctness determination on the basis of the third other vehicle.

(5): In the aspect of (1) described above, when there is a point in front of the host vehicle where the number of lanes in which the host vehicle is able to travel decreases, and when the first other vehicle and the second other vehicle laterally move within a predetermined range before that point, the determiner may perform the correctness determination on the basis of the first other vehicle and the second other vehicle.

(6): A determination method according to another aspect of the present invention includes, by a computer, recognizing a surrounding situation including a first partition line that divides a travel lane of a host vehicle and other vehicles present around the host vehicle on the basis of an output of a detection device that has detected a surrounding situation of the host vehicle, recognizing a second partition line that divides lanes around the host vehicle based on map information, on the basis of position information of the host vehicle, performing correctness determination on whether at least one of the first partition line and the second partition line is correct on the basis of at least one of the first partition line and the second partition line and traveling trajectories of the other vehicles, and when a first other vehicle and a second other vehicle recognized by the first recognizer laterally move in front of the host vehicle, and the positions after the lateral movement differ by a predetermined distance or more, not performing the correctness determination on the basis of the first other vehicle and the second other vehicle.

(7): A storage medium according to still another aspect of the present invention is a computer-readable non-transitory storage medium that has stored a program causing a computer to execute recognizing a surrounding situation including a first partition line that divides a travel lane of a host vehicle and other vehicles present around the host vehicle on the basis of an output of a detection device that has detected a surrounding situation of the host vehicle, recognizing a second partition line that divides lanes around the host vehicle based on map information, on the basis of position information of the host vehicle, performing correctness determination on whether at least one of the first partition line and the second partition line is correct on the basis of at least one of the first partition line and the second partition line and traveling trajectories of the other vehicles, and when a first other vehicle and a second other vehicle recognized by the first recognizer laterally move in front of the host vehicle, and the positions after the lateral movement differ by a predetermined distance or more, not performing the correctness determination on the basis of the first other vehicle and the second other vehicle.

According to the aspects of (1) to (7) described above, it is possible to more appropriately determine correctness of a partition line according to partition lines around the host vehicle and traveling situations of other vehicles.

DESCRIPTION OF EMBODIMENTS

Hereinafter, with reference to the drawings, embodiments of a determination device, a determination method, and a storage medium of the present invention will be described. Hereinafter, as an example, an embodiment in which a vehicle control device including a determination device for performing correctness determination on whether a road partition line (or a lane) that divides a lane in which a vehicle travels is a correct partition line (or a lane) is applied to an automated driving vehicle will be described. Automated driving refers to execution of driving control by automatically controlling, for example, either or both of steering and speed of the vehicle. The driving control described above may also include, for example, an adaptive cruise control system (ACC), a traffic jam pilot (TJP), a lane keeping assistance system (LKAS), an automated lane change (ALC), a collision mitigation brake system (CMBS), and the like. In the automated driving vehicle, driving control (a so-called manual operation) by a manual operation by a user (for example, an occupant) of the vehicle may be executed. In the following description, a case where a law of driving on a left side is applied will be described, but when a law of driving on a right side is applied, the left and right sides can be read in reverse.

[Overall Configuration]

Figure 1:
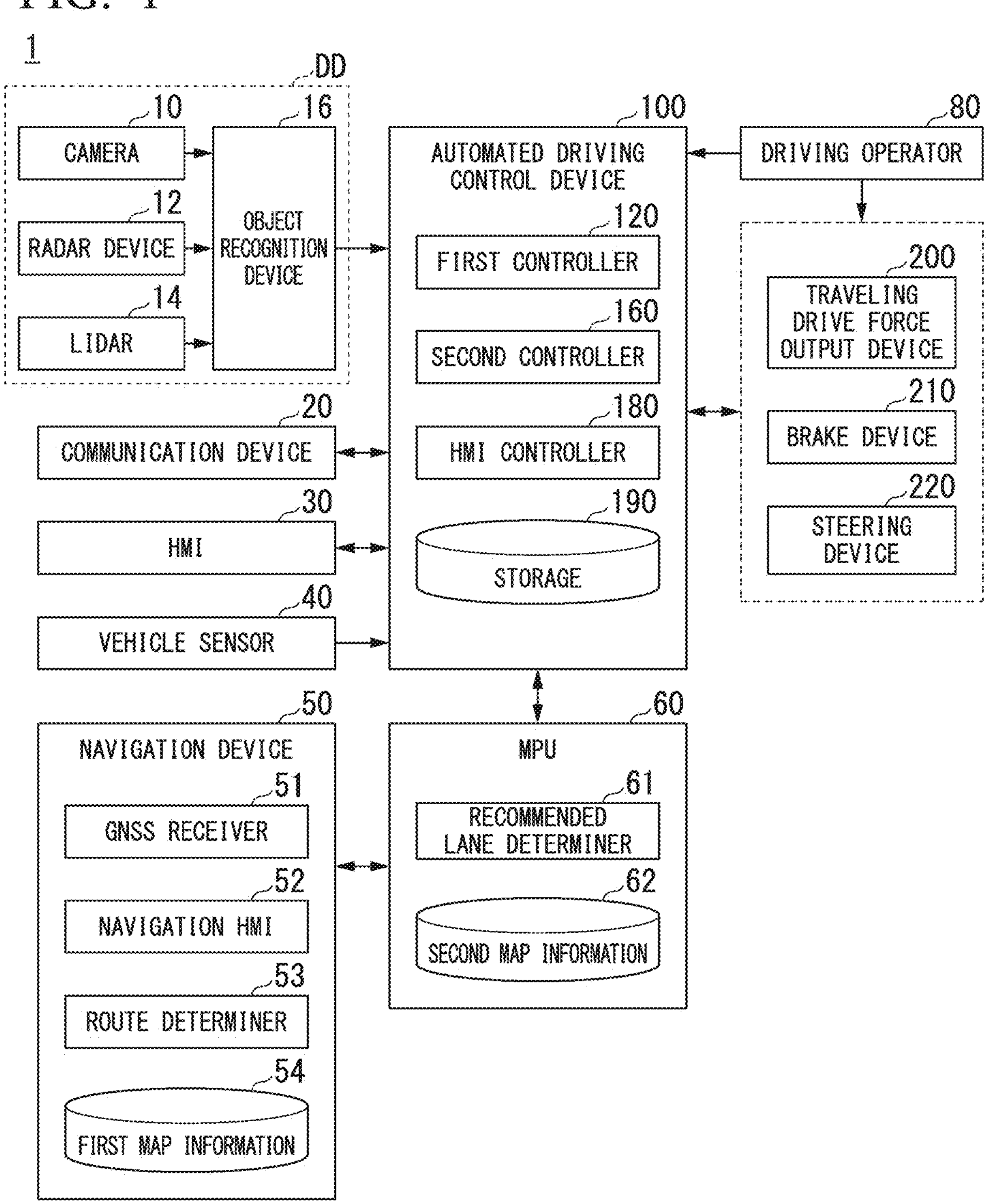
FIG. 1 is a configuration diagram of a vehicle system including a vehicle control device according to an embodiment.

FIG. 1 is a configuration diagram of a vehicle system 1 including a vehicle control device according to the embodiment. The vehicle on which the vehicle system 1 is mounted (hereinafter referred to as a host vehicle M) is, for example, a two-wheeled vehicle, a three-wheeled vehicle, a four-wheeled vehicle, or the like, and the drive source is an internal combustion engine such as a diesel engine or a gasoline engine, an electric motor, or a combination thereof. The electric motor operates using power generated by a generator connected to the internal combustion engine or a discharge power of a battery (a storage battery) such as a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added. A combination of the camera 10, the radar device 12, the LIDAR 14, the object recognition device 16 is an example of a "detection device DD." The HMI 30 is an example of an "output device." The automated driving control device 100 is an example of a "vehicle control device."

The camera 10 is a digital camera that uses a solid-state image sensor such as a charge coupled device (CCD) or a complementary metal oxide semiconductor (CMOS). The camera 10 is attached to an arbitrary place in a host vehicle M in which the vehicle system 1 is mounted. When an image of the front is captured, the camera 10 is attached to an upper part of the front windshield, a back surface of the rear-view mirror, a front head of a vehicle body, or the like. When an image of the rear is captured, the camera 10 is attached to an upper part of the rear windshield, a backdoor, or the like. When an image of the side is captured, the camera 10 is attached to a door mirror or the like. The camera 10 periodically and repeatedly captures, for example, a periphery of the host vehicle M. The camera 10 may be a stereo camera.

The radar device 12 radiates radio waves such as millimeter waves to the periphery of the host vehicle M, and also detects at least a position (a distance and an orientation) of an object by detecting radio waves (reflected waves) reflected by an object in the periphery. The radar device 12 is attached to an arbitrary place on the host vehicle M. The radar device 12 may detect the position and speed of an object in a frequency modulated continuous wave (FM-CW) method.

The LIDAR 14 irradiates the periphery of the host vehicle M with light and measures scattered light. The LIDAR 14 detects a distance to a target based on a time from light emission to light reception. The irradiated light is, for example, a pulsed laser beam. The LIDAR 14 is attached to an arbitrary place on the host vehicle M.

The object recognition device 16 performs sensor fusion processing on a result of detection by some or all of the camera 10, the radar device 12, and the LIDAR 14, and recognizes the position, type, speed, and the like of an object. The object recognition device 16 outputs a result of recognition to the automated driving control device 100. The object recognition device 16 may output the results of detection by the camera 10, the radar device 12, and the LIDAR 14 to the automated driving control device 100 as they are. In this case, the object recognition device 16 may be omitted from constituents (the detection device DD) of the vehicle system 1.

The communication device 20 uses a network such as a cellular network, a Wi-Fi network, Bluetooth (a registered trademark), a dedicated short range communication (DSRC), a local area network (LAN), a wide area network (WAN), or the Internet to communicate with other vehicles present in a vicinity of the host vehicle M, a terminal device of a user who uses the host vehicle M, or various server devices.

The HMI 30 outputs various types of information to the occupant of the host vehicle M and receives an input operation from the occupant. The HMI 30 includes, for example, various display devices, speakers, buzzers, touch panels, switches, keys, microphones, and the like.

The vehicle sensor 40 includes a vehicle speed sensor that detects a speed of the host vehicle M, an acceleration sensor that detects the acceleration, a yaw rate sensor that detects the yaw rate (for example, the rotational angular speed around a vertical axis through a center of gravity of the host vehicle M), an orientation sensor that detects a direction of the host vehicle M, and the like. The vehicle sensor 40 may be provided with a position sensor that detects a position of the vehicle. The position sensor is an example of a "position measurer." The position sensor is, for example, a sensor that acquires position information (longitude and latitude information) from a global positioning system (GPS) device. The position sensor may be a sensor that acquires the position information using a global navigation satellite system (GNSS) receiver 51 of the navigation device 50. The vehicle sensor 40 may derive the speed of the host vehicle M based on a difference (that is, a distance) of the position information at a predetermined time in the position sensor. A result detected by the vehicle sensor 40 is output to the automated driving control device 100.

The navigation device 50 includes, for example, the GNSS receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M based on a signal received from a GNSS satellite. The position of the host vehicle M may be identified or complemented by an inertial navigation system (INS) using an output of the vehicle sensor 40. The navigation HMI 52 includes a display device, a speaker, a touch panel, a key, and the like. The GNSS receiver 51 may also be provided in the vehicle sensor 40. The navigation HMI 52 may be partially or entirely shared with the HMI 30 described above. The route determiner 53 determines, for example, a route from the position of the host vehicle M (or an arbitrary position to be input) identified by the GNSS receiver 51 to a destination to be input by the occupant using the navigation HMI 52 (hereinafter, a route on a map) with reference to the first map information 54. The first map information 54 is, for example, information in which a road shape is expressed by a link indicating a road and nodes connected by a link. The first map information 54 may include point of interest (POI) information, and the like. A route on a map is output to the MPU 60. The navigation device 50 may perform route guidance using the navigation HMI 52 on the basis of the route on a map. The navigation device 50 may transmit a current position and a destination to a navigation server via the communication device 20 and acquire a route equivalent to the route on a map from the navigation server. The navigation device 50 outputs the determined route on a map to the MPU 60.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane from the left to drive. When a branch place is present on the route on a map, the recommended lane determiner 61 determines a recommended lane so that the host vehicle M can travel on a reasonable route to proceed to the branch destination.

The second map information 62 is map information with higher accuracy than the first map information 54. The second map information 62 includes, for example, the number of lanes, a type and a shape of a road partition line (hereinafter referred to as a partition line), information on a center of a lane, information on a road boundary, and the like. The second map information 62 may include information on whether the road boundary includes a boundary including a structure that the vehicle is unable to pass through (including crossing or contacting). Examples of a structure includes, for example, a guardrail, a curb, a median, a fence, and the like. "Being unable to pass through" may include an existence of a step low enough to pass if vibration of the vehicle is allowed that would not normally occur. The second map information 62 may include road shape information, traffic regulation information, address information (addresses and zip codes), facility information, parking lot information, telephone number information, and the like. The road shape information is, for example, a curvature of a road (it may be read as a radius of curvature. The same applies hereinafter), a width, a gradient, and the like. The second map information 62 may be updated at any time by the communication device 20 communicating with an external device. The first map information 54 and the second map information 62 may be integrally provided as map information. The map information may be stored in the storage 190.

The driving operator 80 includes, for example, a steering wheel, an accelerator pedal, and a brake pedal. The driving operator 80 may include a shift lever, an odd-shaped steering wheel, a joystick or other operators. For example, an operation detector that detects an amount of operation of an operator by the occupant or a presence or absence of an operation is attached to each operator of the driving operator 80. The operation detector detects, for example, a steering angle of a steering wheel, a steering torque, an amount of the accelerator pedal or the brake pedal pressed, and the like. Then, the operation detector outputs a result of the detection to the automated driving control device 100, or to one or both of the traveling drive force output device 200, the brake device 210, and the steering device 220.

The automated driving control device 100 executes various types of driving control belonging to automated driving for the host vehicle M. The automated driving control device 100 includes, for example, a first controller 120, a second controller 160, an HMI controller 180, and a storage 190. The first controller 120, the second controller 160, and the HMI controller 180 are realized by, for example, a hardware processor such as a central processing unit (CPU) executing a program (software), respectively. In addition, some or all of these components may be realized by hardware (a circuit unit; including circuitry) such as large scale integration (LSI), an application specific integrated circuit (ASIC), a field-programmable gate array (FPGA), a graphics processing unit (GPU), or a system on chip (SOC), or may be realized by software and hardware in cooperation. The program described above may be stored in advance in a storage device (a storage device having a non-transitory storage medium) such as an HDD or flash memory of the automated driving control device 100, or may be stored in a detachable storage medium such as a DVD, a CD-ROM, or a memory card and installed in the storage device of the automated driving control device 100 by the storage medium (non-transitory storage medium) being attached to a drive device, a card slot, or the like.

The storage 190 may be realized by the various storage devices described above, or an electrically erasable programmable read only memory (EEPROM), a read only memory (ROM), a random access memory (RAM), or the like. The storage 190 stores, for example, various types of information, programs, and the like in the embodiment. The storage 190 may store map information (for example, the first map information 54 and the second map information 62).

Figure 2:
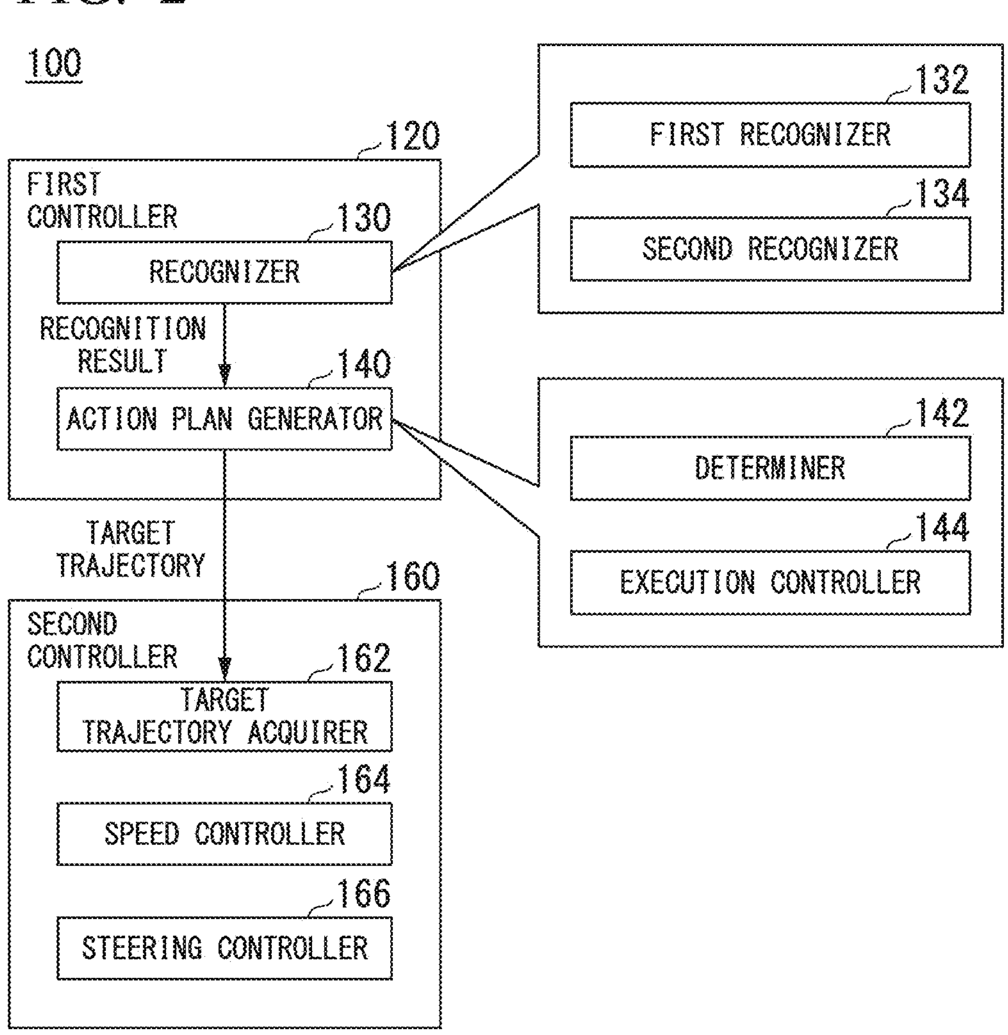
FIG. 2 is a functional configuration diagram of a first controller and a second controller.

FIG. 2 is a functional configuration diagram of the first controller 120 and the second controller 160. The first controller 120 includes, for example, a recognizer 130, and an action plan generator 140. The first controller 120 realizes, for example, a function of artificial intelligence (AI) and a function of a predetermined model in parallel. For example, a function of "recognizing an intersection" may be realized by executing both recognition of an intersection by deep learning or the like and recognition based on a predetermined condition (a signal for pattern matching, a road sign, or the like) in parallel, and scoring and comprehensively evaluating the both. This ensures reliability of automated driving. The first controller 120 executes control related to automated driving of the host vehicle M on the basis of, for example, an instruction from the MPU 60, the HMI controller 180, and the like.

The recognizer 130 recognizes a surrounding situation of the host vehicle M on the basis of a result of the recognition by the detection device DD (information input from the camera 10, the radar device 12, and the LIDAR 14 via the object recognition device 16). For example, the recognizer 130 recognizes states such as a position, a speed, an acceleration, and the like of an object present around the host vehicle M (within a predetermined distance). Examples of an object include objects such as other vehicles (surrounding vehicles), traffic participants (pedestrians, bicycles, and the like) passing on a road, road structures, and other obstacles present in the vicinity. Examples of road structures include road signs, traffic signals, level crossings, curbs, medians, guardrails, fences, and the like. The position of an object is recognized as a position on absolute coordinates with, for example, a representative point (a center of gravity, a drive shaft center, or the like) as an origin point of the host vehicle M, and is used for control. The position of an object may be represented by a representative point such as the center of gravity or a corner of the object, or may be represented by an expressed region. The "state" of an object includes, when the object is a mobile object such as another vehicle, for example, an acceleration or jerk of the mobile object, or the "action state" (for example, whether another vehicle is changing lanes or is about to change lanes).

The recognizer 130 includes, for example, a first recognizer 132 and a second recognizer 134. Details of these functions will be described below.

The action plan generator 140 generates an action plan for causing the host vehicle M to travel by automated driving on the basis of a result of recognition by the recognizer 130. In principle, the action plan generator 140 travels in a recommended lane determined by the recommended lane determiner 61, and furthermore, generates a target trajectory on which the host vehicle M will automatically travel (regardless of an operation of a driver) in the future to be able to respond to the surrounding situation of the host vehicle M on the basis of a surrounding road shape based on a current position of the host vehicle M acquired based on a result of recognition by the recognizer 130 and map information. The target trajectory includes, for example, a speed element. For example, the target trajectory is expressed as a sequence of points (trajectory points) to be reached by the host vehicle M. The trajectory point is a point to be reached by the host vehicle M for each predetermined traveling distance (for example, about several [m]) along a road, and separately, a target speed and a target acceleration for each predetermined sampling time (for example, about decimal point number [sec]) are generated as a part of the target trajectory. The trajectory point may be a position to be reached by the host vehicle M at a corresponding sampling time for each predetermined sampling time. In this case, information on the target speed and target acceleration is expressed by an interval between trajectory points.

The action plan generator 140 may set an automated driving event when a target trajectory is generated. Examples of the event include a constant-speed traveling event in which the host vehicle M is caused to travel in the same lane at a constant speed, a following traveling event in which the host vehicle M is caused to follow another vehicle that is present within a predetermined distance in front of the host vehicle M (for example, within 100 [m]) and is closest to the host vehicle M, a lane change event that causes the host vehicle M to change lanes from a host lane to an adjacent lane, a branching event in which the host vehicle M is caused to diverge into a lane on a destination side at a branch point on a road, a merging event in which the host vehicle M is caused to merge into a main lane at a merging point, and a takeover event in which automated driving is terminated and switched to manual driving. The event may also include, for example, an overtaking event in which the host vehicle M is caused to change lanes to an adjacent lane to overtake a preceding vehicle in the adjacent lane and then is caused to change lanes to an original lane again. The event may also include an avoidance event or the like in which the host vehicle M is caused to perform at least one of braking and steering to avoid an obstacle present in front of the host vehicle M.

The action plan generator 140 may, for example, change an event already determined for a current section to another event or set a new event for the current section according to the surrounding situation of the host vehicle M recognized when the host vehicle M is traveling. The action plan generator 140 may change the event already set for the current section to another event or set a new event for the current section according to an operation of the occupant with respect to the HMI 30. The action plan generator 140 generates a target trajectory corresponding to a set event.

The action plan generator 140 includes, for example, a determiner 142 and an execution controller 144. Details of these functions will be described below. For example, the recognizer 130 and the determiner 142 are examples of a "determination device." The execution controller 144 and the second controller 160 are examples of a "driving controller."

The second controller 160 controls the traveling drive force output device 200, the brake device 210, and the steering device 220 so that the host vehicle M passes through a target trajectory generated by the action plan generator 140 at a scheduled time.

The second controller 160 includes, for example, a target trajectory acquirer 162, a speed controller 164, and a steering controller 166. The target trajectory acquirer 162 acquires information on a target trajectory (trajectory points) generated by the action plan generator 140 and stores it in a memory (not shown). The speed controller 164 controls the traveling drive force output device 200 or the brake device 210 based on a speed element associated with the target trajectory stored in the memory. The steering controller 166 controls the steering device 220 according to a degree of bending of the target trajectory stored in the memory. Processing of the speed controller 164 and the steering controller 166 is realized by, for example, a combination of feedforward control and feedback control. As an example, the steering controller 166 executes feedforward control according to a curvature of a road in front of the host vehicle M and feedback control based on a deviation from the target trajectory in combination.

Returning to FIG. 1, the HMI controller 180 notifies the occupant of predetermined information using the HMI 30. The predetermined information includes, for example, information related to the traveling of the host vehicle M, such as information on a state of the host vehicle M and information on the driving control. The information on the state of the host vehicle M includes, for example, the speed, engine speed, shift position, and the like of the host vehicle M. The information on the driving control includes, for example, information for inquiring whether the driving control is executed by automated driving or whether to start automated driving, information on a driving control status by automated driving, information on an automation level, information that prompts the occupant to drive when automated driving is switched to manual driving. The predetermined information may include information not related to the traveling of the host vehicle M, such as content (for example, a movie) stored in a storage medium such as a TV program or DVD. The predetermined information may include, for example, information on a current position or a destination in automated driving, and information on a remaining amount of fuel in the host vehicle M. The HMI controller 180 may output information received by the HMI 30 to the communication device 20, the navigation device 50, the first controller 120, and the like.

The HMI controller 180 may cause the HMI 30 to output inquiry information to the occupant, processing results by the first controller 120 and the second controller 160, and the like. The HMI controller 180 may transmit various types of information that the HMI 30 is caused to output to a terminal device used by the user of the host vehicle M via the communication device 20.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic controller (ECU) that controls these. The ECU controls the configuration described above according to information input from the second controller 160 or information input from an accelerator pedal of the driving operator 80.

The brake device 210 includes, for example, a brake caliper, a cylinder that transmits a hydraulic pressure to the brake caliper, an electric motor that generates the hydraulic pressure in the cylinder, and a brake ECU. The brake ECU controls the electric motor according to the information input from the second controller 160 or the information input from a brake pedal of the driving operator 80 so that a brake torque according to a braking operation is output to each wheel. The brake device 210 may include a mechanism for transmitting a hydraulic pressure generated by an operation of the brake pedal to the cylinder via a master cylinder as a backup. The brake device 210 is not limited to the configuration described above, and may be an electronically controlled hydraulic brake device that controls an actuator according to the information input from the second controller 160 to transmit the hydraulic pressure of the master cylinder to the cylinder.

The steering device 220 includes, for example, a steering ECU and an electric motor. The electric motor changes, for example, a direction of a steering wheel by applying a force to a rack and pinion mechanism. The steering ECU drives the electric motor according to the information input from the second controller 160 or the information input from a steering wheel of the driving operator 80, and changes the direction of the steering wheel.

[Recognizer and Action Plan Generator]

Next, details of functions of the recognizer 130 (the first recognizer 132 and the second recognizer 134) and the action plan generator 140 (the determiner 142 and the execution controller 144) will be described. Hereinafter, contents of determination processing and driving control (traveling control) based on a result of the determination in the embodiment will be mainly described, and the determination processing will be described in several scenes separately.

[First Scene]

Figure 3:
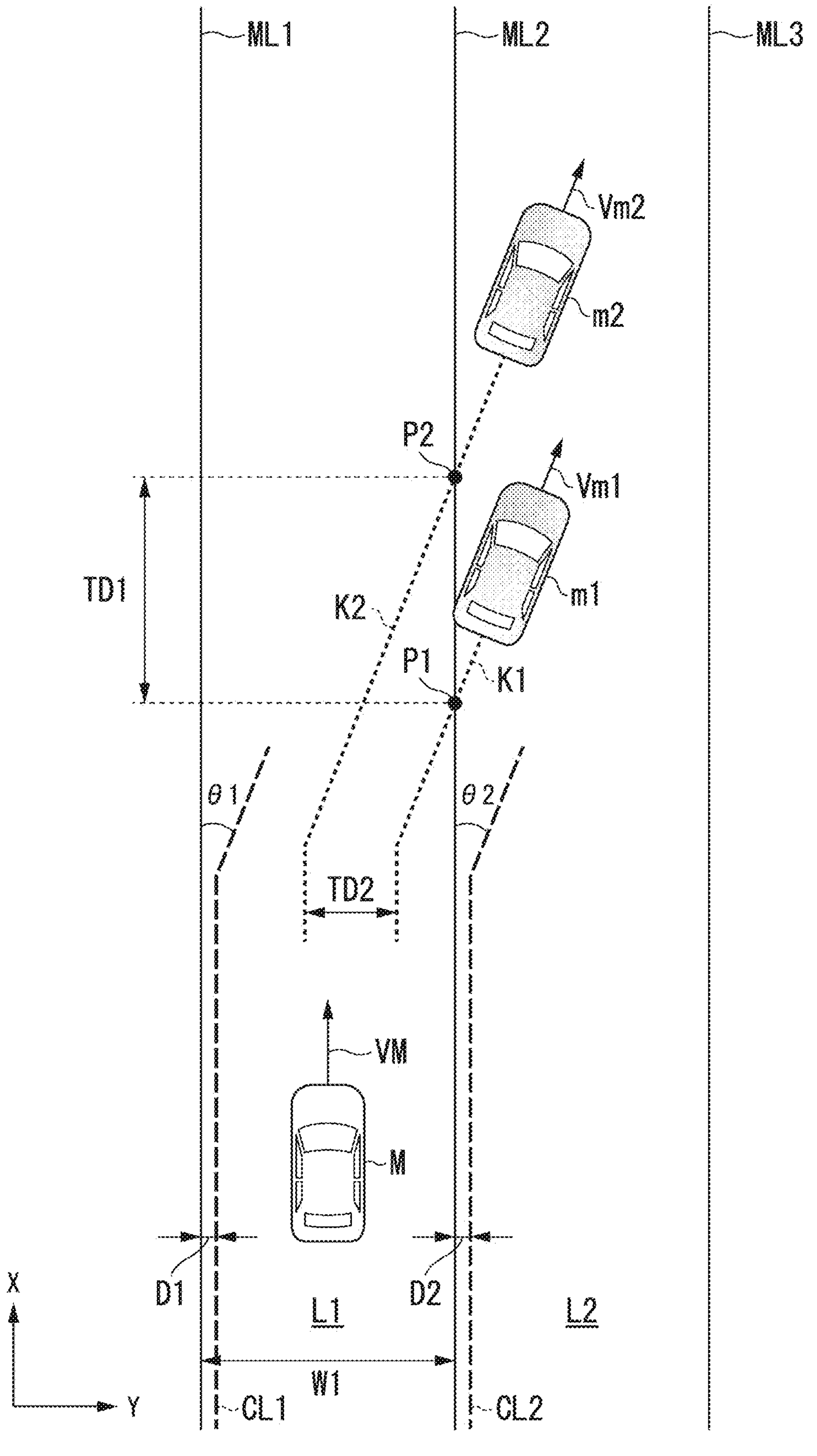
FIG. 3 is a diagram for describing determination processing in a first scene.

FIG. 3 is a diagram for describing determination processing in a first scene. In an example of FIG. 3, partition lines CL1 and CL2 recognized by the detection device DD and partition lines ML1 to ML3 obtained based on map information (for example, the second map information 62) on the basis of position information of the host vehicle M are shown. In the map information, a lane L1 is divided by partition lines ML1 and ML2, and a lane L2 is divided by partition lines ML2 and ML3. The lanes L1 and L2 are lanes in which the vehicle can travel in the same direction (in an X-axis direction in FIG. 3). In the example of FIG. 3, the partition lines CL1 and CL2 are examples of the "first partition line," and the partition lines ML1 to ML3 are examples of the "second partition line." In FIG. 3, it is assumed that the host vehicle M is traveling on the lane L1 at a speed VM, another vehicle m1 is traveling at a speed Vm1 in front of the host vehicle M, and another vehicle m2 is traveling at a speed Vm2 in front of the other vehicle m1 (the host vehicle M). The other vehicle m1 is an example of the "first other vehicle," and the other vehicle m2 is an example of the "second other vehicle."

The first recognizer 132 recognizes the surrounding situation of the host vehicle M on the basis of an output of the detection device DD that detects the surrounding situation of the host vehicle M. For example, the first recognizer 132 recognizes the left and right partition lines CL1 and CL2 that divide a traveling lane (the lane L1) of the host vehicle M on the basis of an image captured by the camera 10 (hereinafter referred to as a camera image). The first recognizer 132 may recognize partition lines that divide an adjacent lane (the lane L2) adjacent to the travel lane. Hereinafter, the partition lines CL1 and CL2 may be referred to as "camera partition lines CL1 and CL2." For example, the first recognizer 132 analyzes the camera image, extracts edge points that have a large luminance difference from neighboring pixels in the image, and recognizes each of the camera partition lines CL1 and CL2 in an image plane by connecting the edge points. The first recognizer 132 converts positions of the camera partition lines CL1 and CL2 to a vehicle coordinate system (for example, XY plane coordinates in FIG. 3) based on a position of a representative point of the host vehicle M. The first recognizer 132 may recognize a curvature or an amount of change in curvature of each of the camera partition lines CL1 and CL2. The amount of change in curvature is, for example, a rate of change over time of curvature in the front X [m] from the host vehicle M of the camera partition lines CL1 and CL2 recognized by the camera 10. The first recognizer 132 may recognize a curvature or an amount of change in curvature of a lane separated by the camera partition lines CL1 and CL2 by averaging the curvature or the amount of change in curvature of each of the camera partition lines CL1 and CL2. The camera partition lines CL1 and CL2 may be recognized or corrected on the basis of an output of a detection device other than camera 10.

The first recognizer 132 recognizes other vehicles that are present in the vicinity (within a predetermined distance) of the host vehicle M. For example, the first recognizer 132 recognizes other vehicles m1 and m2 present in front of the host vehicle M on the basis of the output of the detection device DD that detects the surrounding situation of the host vehicle M. The first recognizer 132 recognizes a position (a relative positions with the host vehicle M) and a speed (a relative speeds with the host vehicle M) of each of the other vehicles m1 and m2. The first recognizer 132 may recognize traveling position information of the other vehicles m1 and m2. The traveling position information is, for example, traveling trajectories K1 and K2 based on positions of representative points of each of the other vehicles m1 and m2 at a predetermined time while they are traveling. The traveling position information may include, for example, information on future traveling prediction trajectories of the other vehicles m1 and m2 based on directions of the traveling trajectories K1 and K2 and the other vehicles m1 and m2.

The second recognizer 134 recognizes, for example, lane partition lines of a lane around the host vehicle M (within a predetermined distance) based on the map information on the basis of the position of the host vehicle M detected by the vehicle sensor 40 or the GNSS receiver 51. For example, the second recognizer 134 refers to the map information on the basis of the position information of the host vehicle M, and recognizes the partition lines ML1 to ML3 that are present in a direction in which the host vehicle M is traveling or the host vehicle M can travel. Hereinafter, the partition lines ML1 to ML3 may be referred to as "map partition lines ML1 to ML3."

The second recognizer 134 may also recognize map partition line ML1 and ML2 as the partition lines that divide the lane L1 in which the host vehicle M travels among the recognized map partition lines ML1 to ML3. The second recognizer 134 recognizes a curvature or an amount of change in curvature of each of the map partition lines ML1 to ML3 based on the map information. The second recognizer 134 may also recognize the curvature or the amount of change in curvature of each of the lanes L1 and L2 divided by the map partition lines by averaging the curvature or the amount of change in curvature of each of the map partition lines ML1 to ML3.

The determiner 142 performs, for example, correctness determination on whether at least one of the camera partition line CL (CL1 and CL2) and the map partition line ML (ML1 to ML3) is correct on the basis of at least one of the camera partition line CL and the map partition line ML and the traveling trajectories K1 and K2 of the other vehicles m1 and m2. The execution controller 144 generates a target trajectory in which driving control is performed so that the host vehicle M travels along a partition line determined to be correct, or performs control or the like for terminating the driving control when both partition lines are determined to be incorrect (or the driving control is not started) on the basis of a result of determination by the determiner 142.

In the example of FIG. 3, as correctness determination, the determiner 142 first determines whether the camera partition line CL (CL1 and CL2) recognized by the first recognizer 132 and the map partition line ML (ML1 and ML2) recognized by the second recognizer 134 deviate from each other. For example, the determiner 142 derives a degree of deviation between the partition lines CL1 and ML1 present at a closest position on the left side as seen from the host vehicle M, and a degree of deviation between the partition lines CL2 and ML2 present at a closest position on the right side as seen from the host vehicle M. Then, the determiner 142 determines that the camera partition line CL and the map partition line ML deviate from each other when the derived degree of deviation is equal to or greater than a threshold value, and determines that they do not deviate when the degree of deviation is less than the threshold value. The deviation determination described above is repeatedly executed at a predetermined timing or cycle.

For example, the determiner 142 superimposes the camera partition lines CL1 and CL2 and also superimposes the map partition lines ML1 and ML2 on a plane (an XY plane) of a vehicle coordinate system based on a position of a representative point of the host vehicle M. Then, when a deviation of partition lines to be compared (the partition lines CL1 and ML1, the partition lines CL2 and ML2) is determined, the determiner 142 determines that the partition lines deviate from each other when each degree of deviation of partition lines is equal to or greater than the threshold value, and determines that they do not deviate when the degree of deviation is less than the threshold value. The degree of deviation is, for example, an amount of deviation of the lateral positions (for example, in a Y axis direction in FIG. 3). In the example of FIG. 3, each of an amount of deviation of the lateral positions D1 of the partition lines CL1 and ML1 and an amount of deviation of the lateral positions D2 of the partition lines CL2 and ML2 may be set as the degree of deviation, and an average value, a maximum value, or a minimum value of the deviation amounts D1 and D2 may be set as the degree of deviation.

The degree of deviation may be, for example, a degree (a magnitude) of an angle formed by two partition lines to be compared, instead of (or in addition) an amount of deviation of the lateral positions described above. In the example of FIG. 3, each of an angle θ1 formed by the partition lines CL1 and ML1 and an angle θ2 formed by the partition lines CL2 and ML2 may be the degree of deviation, and an average value, a maximum value, or a minimum value of the angles θ1 and 02 may also be set as the degree of deviation.

The degree of deviation may be a degree (magnitude) of a difference of the amount of change in curvature of partition lines, instead of (or in addition to) the amount of deviation of the lateral positions described above and the angle formed by the partition lines. The amount of change in curvature is mainly used when a lane is a curved road. The determiner 142 may use an average value of a difference in the amount of curvature change between the partition lines CL1 and ML1 and a difference in the amount of curvature change between the partition lines CL2 and ML2, and the maximum value or minimum value of the difference may also be used. The determiner 142 may use a difference between an average value of an amount of curvature change of the partition lines CL1 and CL2 and an average value of an amount of curvature change of the partition lines ML1 and ML2. The difference between the amount of curvature change in a lane (the lane L1) recognized based on the camera image and the amount of curvature change in the lane recognized based on the map information may also be used.

For example, when a recognition accuracy of the camera partition lines CL1 and CL2 recognized by the first recognizer 132 is lower than the threshold value or the camera partition lines cannot be recognized, the determiner 142 derives the degree of deviation using an angle formed by the traveling trajectories K1 and K2 and map partition line ML of other vehicles traveling in the vicinity. The determiner 142 may set a virtual partition line parallel to the traveling trajectory K1 or K2, and determine the degree of deviation between the set virtual partition line and the map partition line ML. The determiner 142 may determine a deviation from the partition line using the traveling trajectories K1 and K2 regardless of a result of the recognition of the camera partition line CL. Similarly, when the camera partition line CL is recognized and the surrounding map partition line ML cannot be recognized based on the map information, the determiner 142 may determine a deviation between the camera partition line CL and the traveling trajectories K1 and K2, and determine whether the camera partition line CL is correct according to a result of the determination. The determiner 142 may determine the deviation between the camera partition line CL and the traveling trajectories K1 and K2 regardless of a result of the recognition of the map partition line ML.

When it is determined that there is no deviation between the camera partition line CL and the map partition line ML by the deviation determination using the degree of deviation described above, the determiner 142 determines that the camera partition line CL and the map partition line ML are correct partition lines in the correctness determination. When it is determined that the camera partition line CL and the map partition line ML deviate from each other, the determiner 142 determines that at least one of the camera partition line CL and the map partition line ML is not correct. For example, the determiner 142 determines that the camera partition line CL is not correct (or the map partition line ML is correct) when the camera partition line CL and the map partition line ML deviate from each other and the host vehicle M is performing driving control to avoid an obstacle in front of it.

The determiner 142 determines that the camera partition line CL is not correct (or that the map partition line ML is correct) when the camera partition line CL and the map partition line ML deviate from each other and a predetermined number or more of the recognized traveling trajectories of the other vehicles are traveling trajectories along the map partition line ML (including a predetermined allowance range). The determiner 142 also determines that the map partition line ML is not correct (or that the camera partition line CL is correct) when the camera partition line CL and the map partition line ML deviate from each other and a predetermined number or more of the recognized traveling trajectories of the other vehicles are traveling trajectories along the camera partition line CL (including a predetermined allowance range).

When information indicating a lane change (for example, an increase or decrease in lanes) such as a signboard during road construction or a road sign for increasing or decreasing lanes is recognized by the first recognizer 132, but there is no information indicating a lane change in road information acquired from the map information, it is considered to be old map information (or information that does not match a current road shape). Therefore, the determiner 142 may determine that the map partition line is not correct (or the camera partition line is correct). The determiner 142 may also determine that the camera partition line and the map partition line are not correct when, for example, the degree of deviation is greater than or equal to an upper limit value that is greater than a threshold value, or when the number of partition lines in the camera partition line and the map partition line are different.

Here, for example, when the other vehicle m1 and the other vehicle m2 recognized by the first recognizer 132 have moved laterally in front of the host vehicle M, and the positions at which they have moved laterally are different from each other by a predetermined distance or more, the determiner 142 may not perform correctness determination on the basis of the other vehicle m1 and the other vehicle m2. The determiner 142 may not determine that at least one of the camera partition line CL and the map partition line ML is correct instead of not performing the correctness determination. Lateral movement is, for example, movement equal to or greater than the threshold value in a road width direction of the map partition line ML (movement in a Y axis direction in FIG. 3). The threshold value may be, for example, a width of one lane corresponding to a lane change (for example, a width W1 of the lane L1), or a fixed distance. The lateral movement may be movement equal to or greater than the threshold value in a direction orthogonal to the traveling direction of the host vehicle M (in other words, a width direction of the host vehicle M). Lateral movement may be that a reference position (for example, a center of gravity, a center, or a tip), an entire vehicle body, or the traveling trajectories K1 or K2 of the other vehicle m1 or m2 crosses (which may be rephrased as "straddling" or "passing through") a partition line (for example, the map partition line ML) that divides a lane in which the host vehicle is traveling. The predetermined distance may be set on the basis of, for example, the width W1 of the lane L1 in which the host vehicle M travels, or may also be a fixed distance. The width W1 may be, for example, a width of a lane divided by the camera partition lines CL1 and CL2, or a width of a lane divided by the map partition lines ML1 and ML2.

In the example of FIG. 3, the determiner 142 acquires positions P1 and P2 to which the other vehicles m1 and m2 cross the map partition line ML2 as positions of lateral movement of the other vehicles m1 and m2, respectively, and acquires the acquired a distance TD1 between the acquired positions P1 and P2. The distance TD1 is, for example, a distance in an extension direction of the map partition line ML2 (or the traveling direction of the host vehicle M). The determiner 142 determines that the other vehicles m1 and m2 are changing lanes when the distance TD1 is equal to or greater than a predetermined distance (for example, the width W1 or the width W1+a predetermined value $\alpha$). For example, it is assumed that the other vehicles m1 and m2 are traveling in the same lane (for example, the lane L1) and then move laterally. When the distance TD1 at that time is greater than or equal to a width W1 of the lane L1, there is a high possibility that the other vehicles m1 and m2 are not traveling in the same lane. For this reason, the determiner 142 can accurately determine that the other vehicles m1 and m2 are changing lanes when the conditions described above are satisfied, and can determine correctness of a partition line more appropriately by not performing correctness determination on the basis of the other vehicles m1 and m2 that are changing lanes. An accuracy of road shape determination can be improved.

The predetermined distance may be a distance according to the distance TD2 between the lateral positions of the other vehicles m1 and m2 at the same point before they move laterally, based on the traveling trajectories K1 and K2, as shown in FIG. 3, instead of the distance set on the basis of the width W1 of the travel lane L1 as described above. The determiner 142 increases the predetermined distance, for example, as the distance TD2 between the lateral positions increases. For example, when the other vehicles m1 and m2 are traveling in different lateral positions (for example, positions that differ by one lane in general) before they move laterally, the predetermined distance is set to, for example, a distance of two lanes in general. As a result, even if one of the other vehicles is traveling in an adjacent lane adjacent to the traveling lane of the other vehicle, it is possible to accurately determine that the other vehicles m1 and m2 have changed lanes.

[Second Scene]

Figure 4:
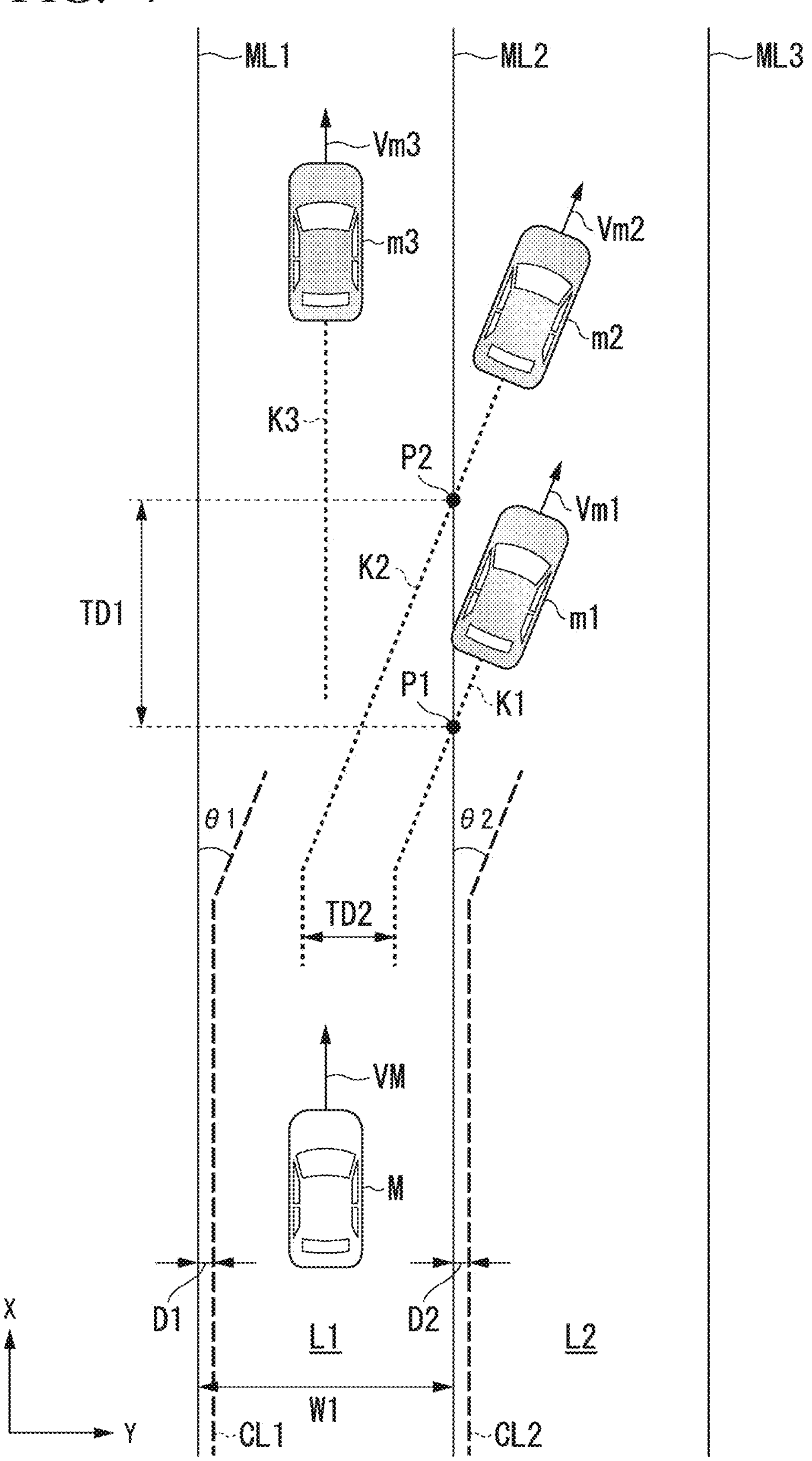
FIG. 4 is a diagram for describing the determination processing in a second scene.

FIG. 4 is a diagram for describing the determination processing in a second scene. In the example of FIG. 4, compared to the first scene shown in FIG. 3, there is a difference in that another vehicle m3 is present in addition to the other vehicles m1 and m2. The other vehicle m3 is an example of a "third other vehicle." In the example of FIG. 4, the other vehicle m3 is traveling on the lane L1 in front of the host vehicle M at a speed Vm3. In the second scene, the first recognizer 132 recognizes a position (a relative position with the host vehicle M), a speed (a relative speed with the host vehicle M), a traveling direction, and traveling position information (for example, a traveling trajectory K3) of the other vehicle m3, in addition to the other vehicles m1 and m2.

As shown in FIG. 4, the determiner 142 may perform the correctness determination on the basis of the other vehicle m3 when another vehicle m3 that is different from the other vehicles m1 and m2 that move laterally is recognized in the vicinity (in the front) of the host vehicle M by the first recognizer 132, and the recognized other vehicle m3 is not laterally moving in the same direction (a direction including a predetermined allowable range) as the other vehicles m1 and m2 that have moved laterally at positions that are different by a predetermined distance or more. In this case, the determiner 142 performs the correctness determination on a partition line on the basis of a degree of deviation between the traveling trajectory K3 of the other vehicle m3 and at least one of the camera partition line CL and the map partition line ML.

Since it can be predicted that the other vehicles m1 and m2 that have moved laterally at positions that are different by a predetermined distance or more are changing lanes (the traveling trajectories K1 and K2 are not along with the camera partition line CL and the map partition line ML), the determiner 142 may also determine that a traveling trajectory K3 of the other vehicle m3 is along with at least one of the camera partition line CL and the map partition line ML. In an example of FIG. 4, since the camera partition lines CL1 and CL2 in the vicinity of the other vehicle m3 cannot be recognized, the determiner 142 determines that the traveling trajectory K3 and the map partition line ML1 and ML2 are aligned. In this case, the determiner 142 may determine that the map partition line ML1 and ML2 are correct.

As a result, it is possible to more appropriately perform the correctness determination on a partition line based on a relationship between the traveling trajectories K1 to K3 of the other vehicle m1 to m3. As shown in FIG. 4, even if there are two other vehicles m1 and m2 moving in the same direction, and there is one other vehicle m3 traveling in a different direction from the other vehicles m1 and m2, even if the minority determines that it is correct while the majority does not, it is possible to accurately determine a road shape on the basis of the other vehicle m3.

[Third Scene]

Figure 5:
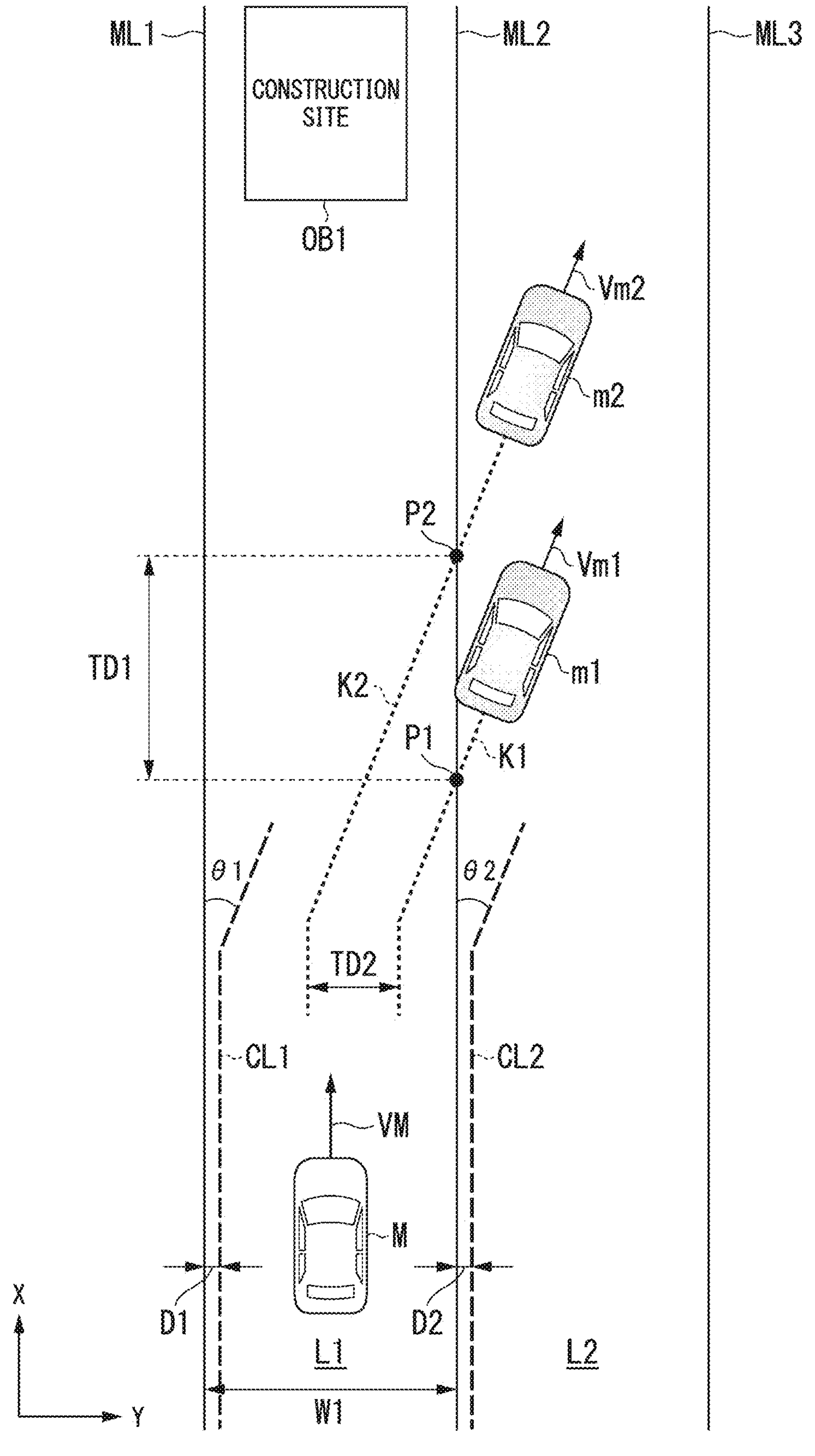
FIG. 5 is a diagram for describing the determination processing in a third scene.

FIG. 5 is a diagram for describing the determination processing in a third scene. In an example of FIG. 5, compared with the first scene shown in FIG. 3, there is a difference in that an obstacle OB1 such as a construction site is present in front of the host vehicle M. In addition to the construction site, the obstacle OB1 may be an object that the host vehicle M cannot travel in the same lane (it is necessary to avoid it for travel), such as a parked vehicle or an accident vehicle. A section where such an obstacle is present is an example of a point where the number of lanes that the vehicle can travel decreases (a point where the number of lanes decreases).

In the third scene, the first recognizer 132 recognizes the obstacle OB1 in front of the host vehicle M on the basis of the recognized surrounding situation. For example, the first recognizer 132 may recognize the obstacle OB1 such as a construction site from a road sign, a signboard, or the like in front of the host vehicle M recognized based on a camera image, and may recognize the obstacle OB1 such as a parked vehicle by object detection by the detection device DD. The first recognizer 132 recognizes a lane in which the obstacle OB1 is present as a non-travelable lane, and recognizes a predetermined range from a position of the obstacle OB1 as a point where the number of lanes decreases. The first recognizer 132 may communicate with an external device by the communication device 20, and acquire a fact that an obstacle (for example, an accident vehicle or a construction site) or a point where the number of lanes decreases is present in front of (in the traveling direction) of the host vehicle M from an external device on the basis of the position information and traveling direction of the host vehicle M.

In the third scene, the determiner 142 performs correctness determination based on the other vehicles m1 and m2 when there is a point where the number of lanes decreases in front of the host vehicle M, and the other vehicles m1 and m2 have moved laterally within a predetermined range in front of the point where the number of lanes decreases as seen from the host vehicle M. For example, when there is a point where the number of lanes decreases, such as a construction side, in front of the vehicle, a position of lateral movement for each other vehicle also varies depending on a preference of each driver as to how far before the point the other vehicles change lanes. However, in this case, when the correctness determination is not performed on the basis of the other vehicles, there is a possibility that the vehicle will enter the construction site. For this reason, as in the third scene, when the other vehicles move laterally within a predetermined range from the point where the number of lanes decreases, correctness determination is performed based on the other vehicles m1 and m2 regardless of the positions of lateral movement, thereby it is possible to perform driving control more appropriately according to the situation.

The point where the number of lanes decreases may be a point having a road shape in which the number of lanes decreases regardless of a presence or absence of an obstacle, in addition to a case where the obstacle OB1 is present. In that case, the point where the number of lanes decreases may be recognized by the first recognizer 132 or may also be recognized based on the map information by the second recognizer 134.

[about Driving Control]

The execution controller 144 determines driving control for the host vehicle M on the basis of a result of the determination by the determiner 142, and executes the determined driving control. "Determining driving control" may include, for example, determining content (a type) of the driving control and determining whether to execute the driving control (whether to suppress). "Executing driving control" may include, for example, continuing the driving control that has already been executed in addition to switching and executing content of the driving control. Suppressing driving control may include not only not executing (terminating) the driving control, but also lowering an automation level of the driving control. The driving control executed by the execution controller 144 may include ACC, TJP, LKAS, ALC, CMBS, and the like, and may include various other types of driving control for avoiding contact with surrounding vehicles. The execution controller 144 generates a target trajectory for executing driving control, and outputs the generated target trajectory to the second controller 160.

Here, in the first scene, the driving control executed by the execution controller 144 includes at least first driving control and second driving control. The first driving control is, for example, driving control that executes at least steering control of the steering and speed of the host vehicle M on the basis of a partition line (for example, a partition line of a portion in which a camera partition line and a map partition line do not deviate from each other) recognized by the first recognizer 132 or the second recognizer 134. For example, the first driving control is driving control that causes the host vehicle M to travel so that the representative point of the host vehicle M passes through the center of a lane divided by partition lines. The second driving control is, for example, driving control that executes at least steering control of the steering and speed of the host vehicle M on the basis of a map partition line or traveling position information of other vehicles. The second driving control is, for example, driving control that causes the host vehicle M to travel so that the representative point of the host vehicle M travels on a trajectory along the traveling trajectory of the other vehicle m1.

Further, the driving control may include third driving control that executes at least steering control of the steering and speed of the host vehicle M by prioritizing the camera partition line over the map partition line, and fourth driving control that executes at least steering control of the steering or speed of the host vehicle M by prioritizing the map partition line over the camera partition line. Prioritizing the camera partition line over the map partition line means, for example, that processing is basically performed based on the camera partition line, but when, for example, the recognition accuracy of the camera partition line falls below a threshold value or recognition thereof becomes impossible, the processing is temporarily switched to processing based on the map partition line. Prioritizing the map partition line over the camera partition line means that processing is basically performed based on the map partition line, but when, for example, the map partition line cannot be identified, the processing is temporarily switched to processing based on the camera partition line. The third driving control and the fourth driving control are, for example, driving control when the camera partition line and the map partition line deviate from each other.

The driving control may include a plurality of types of driving control based on an automation level (an example of a degree of automation). The automation level includes, for example, a first level, a second level whose degree of automation of driving control is lower than that of the first level, and a third level whose degree of automation of driving control is lower than that of the second level. The automation level may include a fourth level (an example of a fourth degree of control) having a lower degree of automation of driving control than the third level. Here, the automation level may be a level defined by standardized information, laws and regulations, or the like, or may be an index value set independently of them. Therefore, the type, content, and number of automation levels are not limited to the following examples. A low degree of automation of driving control means, for example, that an automation rate in the driving control is small and a task imposed on the driver is large (severe). A low driving control automation means that a degree to which the automated driving control device 100 controls the steering or acceleration or deceleration of the host vehicle M is low (a degree of need for the driver to intervene in the steering or acceleration or deceleration operation is high). The tasks imposed on the driver are, for example, monitoring the surroundings of the host vehicle M, operating a driving operator, and the like. Operations of the driving operator include, for example, that the driver is grasping the steering wheel (hereinafter referred to as a hands-on state). The task imposed on the driver is, for example, a task for the occupant necessary to maintain an automated driving of the host vehicle M (a driver task). Therefore, when the occupant is unable to execute the imposed task, an automation level will be lowered. For example, the first level of driving control may include, for example, driving control such as ACC, ALC, LKAS, TJP, and the like. The second or third level of driving control may include, for example, driving control such as ACC, ALC, LKAS, and the like. The fourth level of driving control may include a manual driving. As the fourth level of driving control, for example, driving control such as ACC may be executed. Among the first to fourth levels, the first level has a highest degree of automation of driving control, and the fourth level has a lowest degree of automation of driving control.

At the first level, there are no tasks imposed on the occupants (tasks imposed on the driver are the mildest). The task imposed on the occupant at the second level is, for example, monitoring the surroundings (especially the front) of the host vehicle M. The task imposed on the occupant at the third level includes, for example, being in a hands-on state in addition to monitoring the surroundings of the host vehicle M. The task imposed on the occupant (for example, the driver) at the fourth level is, for example, in addition to monitoring the surroundings of the host vehicle M and being in the hands-on state, an operation for controlling the steering and speed of the host vehicle M by the driving operator 80. In other words, in a case of the fourth level, the occupants can immediately take over driving, and the task imposed on the driver is the most severe. The content of driving control and the task imposed on the occupant at each automation level are not limited to the examples described above. The automated driving control device 100 executes driving control at any of the first to fourth levels based on the surrounding situation of the host vehicle M and a task performed by the occupant. At least a part of the first to fourth level may be associated with, for example, the first to fourth driving control described above.

For example, the execution controller 144 generates a target trajectory to execute the first driving control when it is determined by the determiner 142 that both the camera partition line CL and the map partition line ML are correct partition lines (for example, the camera partition line CL and the map partition line ML do not deviate from each other). When one of the camera partition line CL and the map partition line ML is determined to be correct, the execution controller 144 generates a target trajectory for executing any of the second to fourth driving control based on the correct partition line. The execution controller 144 may perform control such as terminating driving control for the host vehicle M and switching it to a manual operation of the occupant on the basis of a result of the determination. Furthermore, the execution controller 144 may switch the automation level corresponding to the driving control on the basis of a result of the determination. In this case, for example, when the camera partition line CL and the map partition line ML are determined to be correct, the first level of driving control is executed, and when they are determined not to be correct, the second to fourth level of driving control is executed according to the situation.

[Processing Flow]

Figure 6:
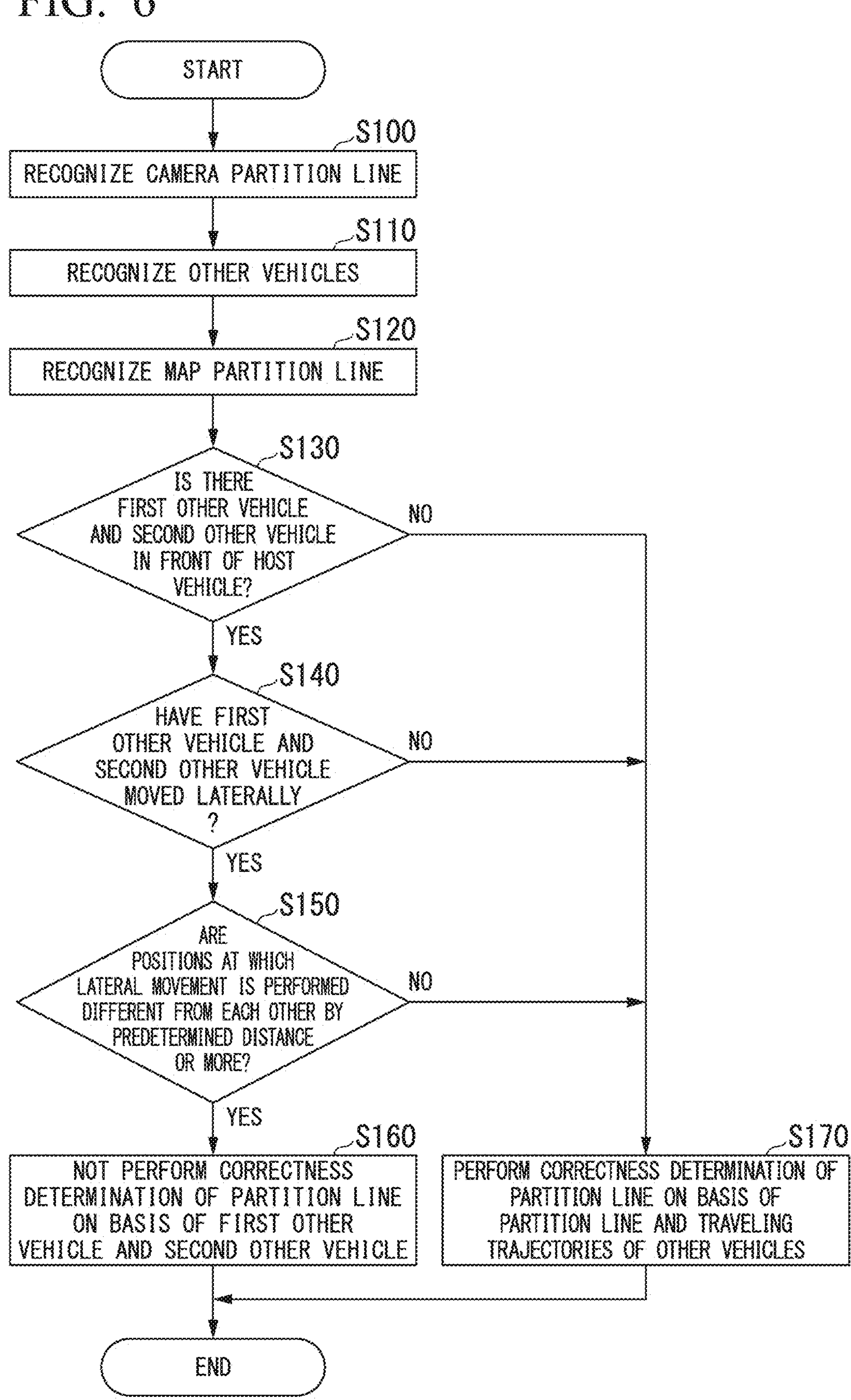
FIG. 6 is a flowchart which shows an example of processing executed by the automated driving control device of the embodiment.

Hereinafter, processing executed by the automated driving control device 100 of the embodiment will be described. FIG. 6 is a flowchart showing an example of processing executed by the automated driving control device 100 of the embodiment. Hereinafter, among pieces of the processing executed by the automated driving control device 100, the correctness determination processing of at least one of the camera partition line CL and the map partition line ML will be mainly described. The automated driving control device 100 executes the driving control of the host vehicle M according to a result of the determination processing shown in FIG. 6. The processing shown below may be repeatedly executed at a predetermined timing or a predetermined period, and may also be executed repeatedly while automated driving is being executed by the automated driving control device 100.

In the example of FIG. 6, the first recognizer 132 recognizes partition lines (camera partition lines) present around the host vehicle M on the basis of the output of the detection device DD that detects the surrounding situation of the host vehicle M (step S100). Next, the first recognizer 132 recognizes other vehicles present around the host vehicle M (step S110). Next, the second recognizer 134 refers to the map information on the basis of the position information of the host vehicle M, and recognizes partition lines (map partition lines) present around the host vehicle M based on the map information (step S120).

Next, the determiner 142 determines whether a first other vehicle and a second other vehicle are present in front of the host vehicle M (step S130). When it is determined that the first other vehicle and the second other vehicle are present, the determiner 142 determines whether the first other vehicle and the second other vehicle have moved laterally (step S140). In the processing of step S130, the determiner 142 determines whether the first other vehicle and the second other vehicle are present, and when it is determined that the first other vehicle and the second other vehicle are present, it determines whether the first other vehicle and the second other vehicle have moved laterally in front of the host vehicle M in the processing of step S140.

When it is determined that the vehicles have moved laterally, the determiner 142 determines whether the positions at which the first other vehicle and the second other vehicle have moved laterally are different from each other by a predetermined distance or more (step S150). When it is determined that the positions are different from each other by a predetermined distance or more, the determiner 142 does not determine the correctness of a partition line (at least one of a camera partition line and a map partition line) on the basis of the first other vehicle and the second other vehicle (step S160). In this case, for example, the determiner 142 may determine the correctness of a partition line based on a traveling trajectory of another vehicle (for example, a third other vehicle) that does not move laterally other than the first other vehicle and the second other vehicle, and may also determine that both of the camera partition line and the map partition line are not correct.

When a first other vehicle and a second other vehicle are not present in front of the host vehicle M in the processing of step S130, when it is determined that the first other vehicle and the second other vehicle are not moving laterally in the processing of step S140, or when it is determined that the positions of the lateral movement are not different from each other by a predetermined distance or more in the processing of step S150, correctness determination of a partition line is performed on the basis of the partition line (at least one of a camera partition line and a map partition line) and the traveling trajectories of other vehicles (step S170). For example, in the processing of step S150, when the positions of the lateral movement are different from each other by less than a predetermined distance, the determiner 142 determines a deviation between the traveling trajectories of the first other vehicle and the second other vehicle and the map partition line, and determines that the map partition line is not correct because a degree of deviation is equal to or greater than the threshold value. As a result, the processing of this flowchart will be terminated.

Modified Example

In the embodiment, the determiner 142 may determine that the first other vehicle and the second other vehicle are changing lanes, for example, when the first other vehicle and the second other vehicle recognized by the first recognizer 132 have moved laterally in front of the host vehicle M, and the positions of the lateral movement are different from each other by a predetermined distance or more. The determiner 142 may also determine that the map partition line is correct when it is determined that they are changing lanes.

According to the embodiment described above, the determination device (the recognizer 130 and the determiner 142) includes the first recognizer 132 that recognizes a camera partition line (a first partition line) that divides the traveling lane of the host vehicle M and a surrounding situation including other vehicles present around the host vehicle M on the basis of the output of the detection device DD that detects the surrounding situation of the host vehicle M, a second recognizer 134 that recognizes a camera partition line (a second partition line) that divides lanes around the host vehicle M based on map information, on the basis of the position information of the host vehicle M, and a determiner 142 that performs a correctness determination on whether at least one of the camera partition line and the map partition line is correct on the basis of at least one of the camera partition line and the map partition line and traveling trajectories of the other vehicles, in which the determiner 142 may determine the correctness of a partition line more appropriately according to the partition lines around the host vehicle and traveling situations of the other vehicles by not performing correctness determination on the basis of the first other vehicle and the second other vehicle when the first other vehicle and the second other vehicle recognized by the first recognizer 132 have moved laterally in front of the host vehicle M and the positions at which the vehicles have moved laterally are different from each other by a predetermined distance or more. According to the embodiment, it is possible to execute more appropriate driving control on the basis of a result of the determination, and to further improve continuity of the driving control. In turn, it can contribute to the development of sustainable transport systems.

According to the embodiment, for example, when the first other vehicle and the second other vehicle straddle a map partition line at the same position (when the positions of the lateral movement are different from each other by less than a predetermined distance), other vehicles can be used in correctness determination of the map partition line to determine that the map partition line is not correct. According to the embodiment, for example, when the first other vehicle and the second other vehicle straddle the map partition line at different positions in the traveling direction (when the positions of the lateral movement are different from each other by a predetermined distance or more), it is possible to determine that the first other vehicle and the second other vehicle are changing lanes, and to determine a road shape more accurately by not using other vehicles in the correctness determination of the map partition line. According to the embodiment, for example, when there are three other vehicles, two of which move laterally, and one does not move laterally (for example, in a case of going straight), since the correctness determination is performed on the basis of one unit that is a minority depending on a situation instead of a majority, it is possible to realize more appropriate correctness determination of a partition line depending on the situation.

The embodiments described above can be expressed as follows.

A determination device includes a storage medium that stores computer-readable instructions, and a processor connected to the storage medium, in which the processor executes the computer-readable instructions to: recognize a surrounding situation including a first partition line that divides a travel lane of a host vehicle and other vehicles present around the host vehicle on the basis of an output of a detection device that has detected a surrounding situation of the host vehicle, recognize a second partition line that divides lanes around the host vehicle on the basis of map information, on the basis of position information of the host vehicle, perform correctness determination on whether at least one of the first partition line and the second partition line is correct on the basis of at least one of the first partition line and the second partition line and traveling trajectories of the other vehicles, and when a first other vehicle and a second other vehicle recognized laterally move in front of the host vehicle, and the positions after the lateral movement differ by a predetermined distance or more, not to perform correctness determination on whether at least one of the first partition line and the second partition line is correct on the basis of the first and second other vehicles.

Although a mode for carrying out the present invention has been described above using the embodiment, the present invention is not limited to the embodiment, and various modifications and substitutions can be made within a range not departing from the gist of the present invention.

What is claimed is:

1. A determination device comprising:

a first recognizer configured to recognize a surrounding situation including a first partition line that divides a travel lane of a host vehicle and other vehicles present around the host vehicle on the basis of an output of a detection device that has detected a surrounding situation of the host vehicle;

a second recognizer configured to recognize a second partition line that divides lanes around the host vehicle based on map information, on the basis of position information of the host vehicle; and a determiner configured to perform correctness determination on whether at least one of the first partition line and the second partition line is correct on the basis of at least one of the first partition line and the second partition line and traveling trajectories of the other vehicles, wherein, when a first other vehicle and a second other vehicle recognized by the first recognizer laterally are moving in front of the host vehicle, and the positions after the lateral movement differ by a predetermined distance or more, the determiner does not perform the correctness determination on the basis of the first other vehicle and the second other vehicle.

2. The determination device according to claim 1, wherein the predetermined distance is set on the basis of a width of a lane divided by the first partition line or a lane divided by the second partition line.

3. The determination device according to claim 1, wherein the predetermined distance is set according to a distance between the lateral positions before the first other vehicle and the second other vehicle move laterally.

4. The determination device according to claim 1, wherein, when the first recognizer recognizes a third other vehicle that is different from the first other vehicle and the second other vehicle, and the third other vehicle has not moved laterally in the same direction as the first other vehicle and the second other vehicle that have moved laterally at positions that are different by a predetermined distance or more, the determiner performs the correctness determination on the basis of the third other vehicle.

5. The determination device according to claim 1, wherein, when there is a point in front of the host vehicle where the number of lanes in which the host vehicle is able to travel decreases, and when the first other vehicle and the second other vehicle laterally move within a predetermined range before that point, the determiner performs the correctness determination on the basis of the first other vehicle and the second other vehicle.

6. A determination method comprising:

by a computer, recognizing a surrounding situation including a first partition line that divides a travel lane of a host vehicle and other vehicles present around the host vehicle on the basis of an output of a detection device that has detected a surrounding situation of the host vehicle;

recognizing a second partition line that divides lanes around the host vehicle based on map information, on the basis of position information of the host vehicle;

performing correctness determination on whether at least one of the first partition line and the second partition line is correct on the basis of at least one of the first partition line and the second partition line and traveling trajectories of the other vehicles; and when a first other vehicle and a second other vehicle recognized by the first recognizer laterally move in front of the host vehicle, and the positions after the lateral movement differ by a predetermined distance or more, not performing the correctness determination on the basis of the first other vehicle and the second other vehicle.

7. A computer-readable non-transitory storage medium that has stored a program causing a computer to execute:

recognizing a surrounding situation including a first partition line that divides a travel lane of a host vehicle and other vehicles present around the host vehicle on the basis of an output of a detection device that has detected a surrounding situation of the host vehicle, recognizing a second partition line that divides lanes around the host vehicle based on map information, on the basis of position information of the host vehicle, performing correctness determination on whether at least one of the first partition line and the second partition line is correct on the basis of at least one of the first partition line and the second partition line and traveling trajectories of the other vehicles, and when a first other vehicle and a second other vehicle recognized by the first recognizer laterally move in front of the host vehicle, and the positions after the lateral movement differ by a predetermined distance or more, the determiner does not perform the correctness determination on the basis of the first other vehicle and the second other vehicle.

* * * * *